United States Patent [19]

Fernandez et al.

[11] Patent Number: 5,241,568
[45] Date of Patent: Aug. 31, 1993

[54] METHOD AND APPARATUS FOR SYNCHRONIZING A RECEIVER TO A TRANSMITTED SIGNAL WHILE CONSERVING POWER

[75] Inventors: Frank Fernandez, Boynton Beach, Fla.; Richard A. Erhart, Chandler, Ariz.

[73] Assignee: Motorola, Inc., Schaumburg, Ill.

[21] Appl. No.: 801,329

[22] Filed: Dec. 2, 1991

[51] Int. Cl.[5] .................. H04L 7/00; H04L 7/06; H04B 1/16
[52] U.S. Cl. .................. 375/116; 375/113; 455/343
[58] Field of Search .............. 375/116, 108, 113, 114, 375/106; 370/105.1, 106; 455/343

[56] References Cited

U.S. PATENT DOCUMENTS

| | | | |
|---|---|---|---|
| 4,518,961 | 5/1985 | Davis et al. | 340/825.44 |
| 4,787,095 | 11/1988 | Forth et al. | 375/114 |
| 4,995,099 | 2/1991 | Davis | 455/343 |
| 4,996,526 | 2/1991 | DeLuca | 455/343 |

*Primary Examiner*—Curtis Kuntz
*Assistant Examiner*—Hai H. Phan
*Attorney, Agent, or Firm*—Jose Gutman; Daniel R. Collopy; William E. Koch

[57] ABSTRACT

A receiver (200) receives (203) a transmitted signal having a first predetermined signal for indicating a start of a new transmission to the receiver and having a second predetermined signal inserted at periodic sampling time intervals for synchronizing the receiver to the transmitted signal. The receiver (200) synchronizes to the transmitted signal by detecting the first predetermined signal (208) followed by the second predetermined signal (210), and establishing subsequent periodic sampling time intervals therefrom. The receiver (200) conserves power (228) during a second portion of a periodic sampling time interval following a detection of a first portion of the second predetermined signal (210) during a first portion of the periodic sampling time interval. If the receiver (200) does not detect the first portion of the second predetermined signal (210) then the receiver (200) searches for a portion of the first predetermined signal (208) during the second portion of the periodic sampling time interval to determine a possible start of a new transmission.

17 Claims, 5 Drawing Sheets

METHOD AND APPARATUS FOR SYNCHRONIZING A RECEIVER TO A TRANSMITTED SIGNAL WHILE CONSERVING POWER

FIELD OF THE INVENTION

This invention relates generally to the area of power conservation for a receiver, and more particularly to a method and apparatus for conserving power during a second portion of the reception of a periodic predetermined signal when a first portion thereof is detected, while attempting to re-synchronize the receiver to a new transmission during the second portion of the periodic predetermined signal when the first portion is not detected.

BACKGROUND OF THE INVENTION

Power conservation is a primary concern for modern communication receivers, such as selective call receivers and the like. Conventional communication protocols, including the Post Office Code Standardisation Advisory Group or POCSAG protocol, have well known provisions for conserving power at the receivers. Typically, these include providing a predetermined signal during predetermined time intervals in a periodic fashion that can be monitored by the receivers. At those time intervals that monitoring is not required, the receivers can conserve power by shutting off non-essential circuits and functions. In this way, the receivers can extend the life of their power source, e.g. their battery.

Figure 1A:
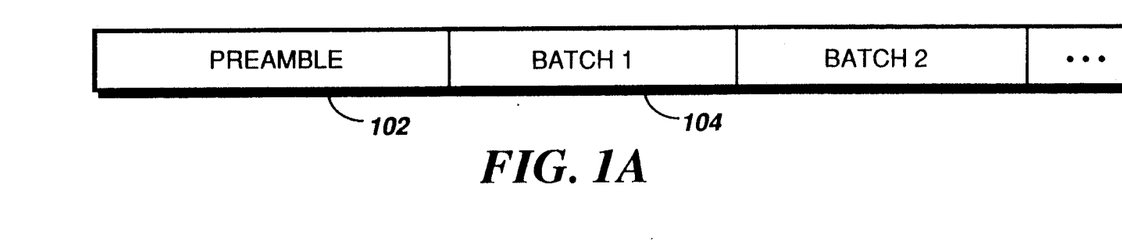
FIGS. 1A, 1B, and 1C illustrate the POCSAG protocol.
Figure 1B:
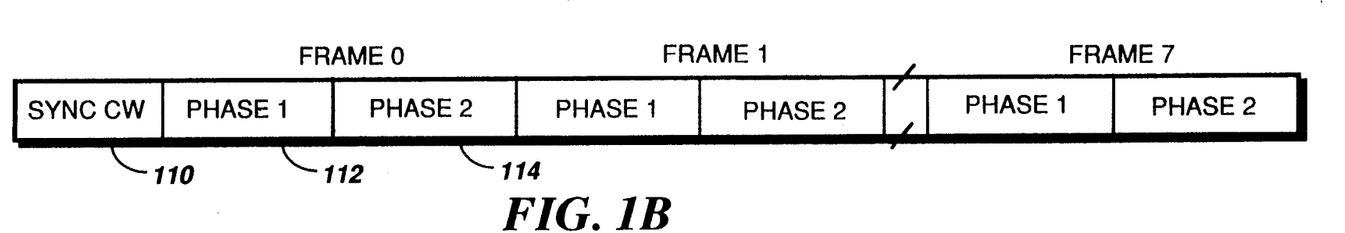
Figure 1C:
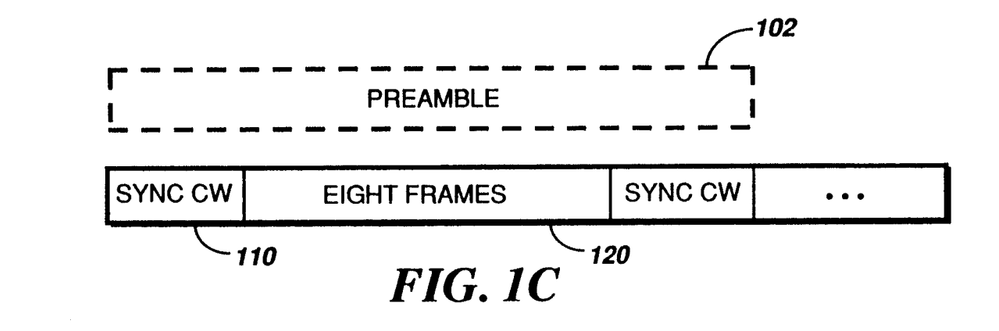

FIGS. 1A, 1B, and 1C, illustrate the POCSAG signalling protocol. Referring to FIG. 1A, every new transmission comprises a preamble 102 followed by at least one batch 104, and often a number of batches. Each batch, as shown in FIG. 1B, comprises a predetermined synchronization code word (hereinafter "SYNC CW") followed by eight frames, numbered zero through seven. Each frame includes two phases, 112, 114, that each can contain address information, message information, or control information, as defined by the POCSAG protocol.

A receiver following the POCSAG protocol can synchronize to a new transmission by monitoring the preamble 102 of the new transmission. Subsequently, the receiver synchronizes to the SYNC CW of each batch and typically then monitors an assigned frame within the batch for address information. To conserve power, the receiver may avoid monitoring other frames in the batch. The next monitoring time interval occurs at the SYNC CW of the following batch. Therefore, by only monitoring the SYNC CW of each batch within a transmission, the receiver maintains synchronization to the transmission while conserving power. Once the SYNC CW is detected the receiver can monitor the assigned frame within the batch for address information, and shut off non-essential circuits and functions at other times.

FIG. 1C illustrates a feature of the POCSAG protocol that provides receivers the capability to detect a new transmission while monitoring the present transmission. The length of the preamble 102 is equivalent to the combined length of two SYNC CW's and eight frames 120. Receivers that periodically monitor for the SYNC CW of a batch within the present transmission are guaranteed to monitor at least a portion of the preamble of a subsequent new transmission. In this way, the receivers can detect the new transmission by the presence of the preamble 102. The receivers can then synchronize their detection circuits to the new transmission and search for the SYNC CW of the first batch of the new transmission to begin monitoring for address information therein.

A known method of further conserving power within a receiver comprises monitoring a portion of a periodic predetermined signal within a transmitted signal, such as a portion of the SYNC CW in the POCSAG protocol. When a first portion of the SYNC CW is detected within an acceptable bit error rate, non-essential circuits and functions of the receiver can be shut off for a second portion of the SYNC CW. Although this has the advantage of significantly conserving power, detecting the first portion of the SYNC CW under certain signalling conditions may be less reliable than detecting the full SYNC CW. Specifically, a receiver may falsely determine that it maintains synchronization with the present transmission, while delaying detection of a subsequent new transmission. In a worst case, the receiver may not synchronize to the new transmission in time to detect the first batch thereof. Consequently, the receiver may miss its address information and any associated message information. This can be very frustrating to a user of the device. In a medical or governmental communication system, the consequences of not receiving a message may be grave and devastating.

Thus, what is necessary is a method and apparatus for conserving power and maintaining synchronization by monitoring a portion of a periodic predetermined signal within the present transmission, while re-synchronizing to a new transmission in time to reliably detect the first batch thereof.

In carrying out one form of this invention, there is provided a method for synchronizing a receiver to a transmitted signal, the transmitted signal having a first predetermined signal for indicating a start of a new transmission to the receiver and having a second predetermined signal inserted at periodic sampling time intervals for synchronizing the receiver to the transmitted signal, the method comprising the following steps: synchronizing to the transmitted signal by detecting the first predetermined signal followed by the second predetermined signal, and establishing subsequent periodic sampling time intervals therefrom, conserving power in the receiver during a second portion of one of the periodic sampling time intervals following a detection of a first portion of the second predetermined signal during a first portion of the one of the periodic sampling time intervals, and searching for a portion of the first predetermined signal during the second portion of the one of the periodic sampling time intervals following a lack of detection of the first portion of the second predetermined signal during the first portion of the one of the periodic sampling time intervals.

DESCRIPTION OF A PREFERRED EMBODIMENT

Figure 2:
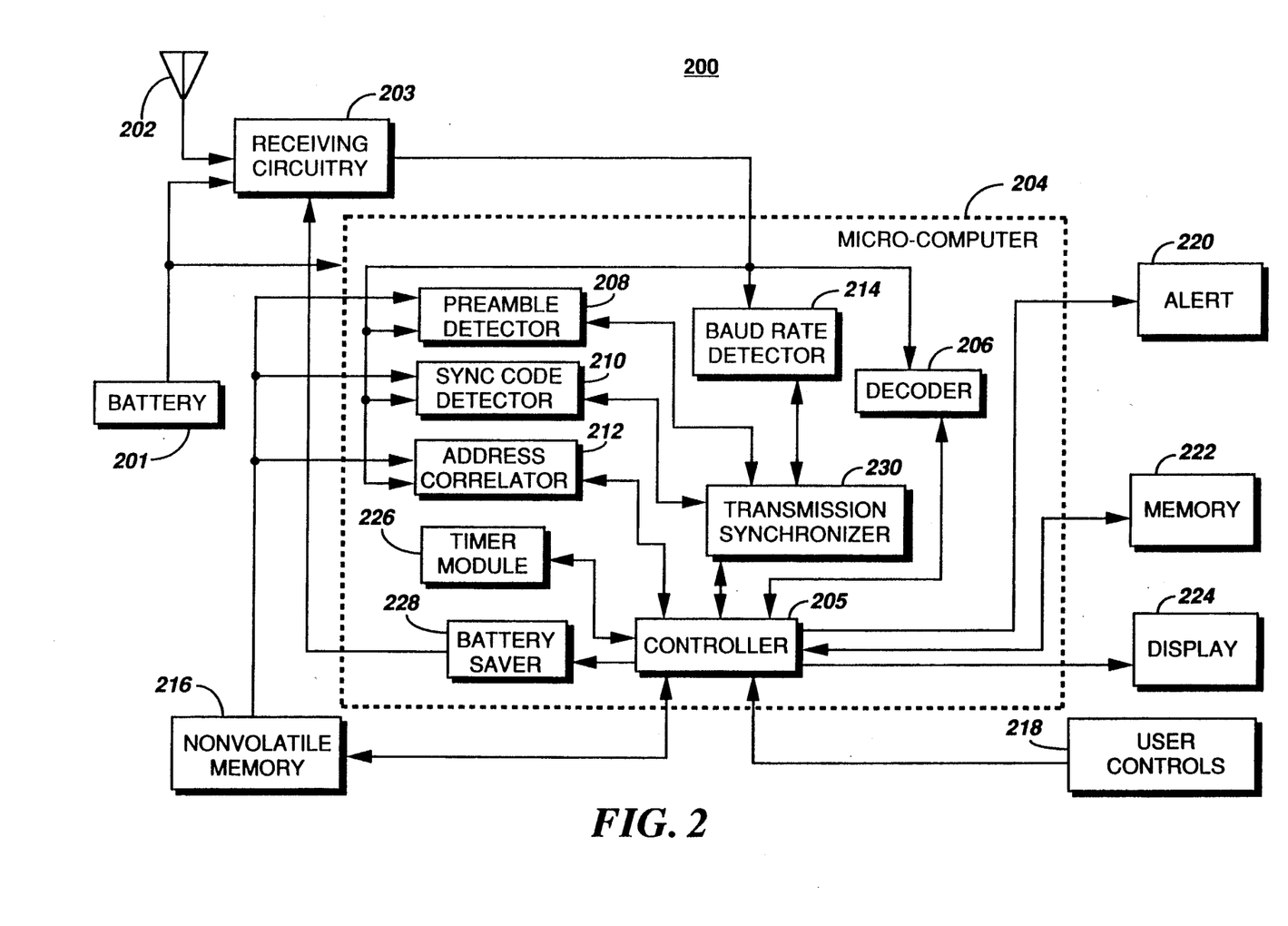
FIG. 2 shows a block diagram of a selective call receiver according to a preferred embodiment of the present invention.

Referring to FIG. 2, a block diagram of a receiver (e.g., a selective call receiver or paging receiver) 200 is shown, according to a preferred embodiment of the present invention. The selective call receiver 200 is powered by a battery 201 and normally operates to receive a POCSAG modulated radio frequency signal via an antenna 202. Receiving circuitry 203 is coupled to the antenna 202 to receive and demodulate the modulated radio frequency signal to recover any transmitted information signal present in the modulated radio frequency signal using conventional techniques. The receiving circuitry 203 is capable of recovering analog or digital information. Received digital information is recovered as a serial bit stream that is then coupled to a micro-computer 204 for interpreting and decoding the serial bit stream as address, control, and data signals, as defined by the POCSAG protocol.

In the preferred embodiment, the micro-computer 204 is a Motorola, Inc. manufactured microcomputer (e.g., an MC68HC05C4 or an MC68HC05C8). The micro-computer 204 preferably includes an address correlator 212 and a data decoder 206 that are coupled to the receiving circuitry 203. Under control of a controller 205 the address correlator 212 determines when a preassigned address is detected in the received serial bit stream. Optionally, the data decoder 206, also under control of the controller 205, then decodes and couples message information to the message memory 222 via the controller 205, as will be more fully discussed below.

Additionally, a preamble detector 208, a synchronization code word (i.e., SYNC CW) detector 210, and a baud rate detector 214 are coupled to the receiving circuitry 203 for detecting the presence of a preamble signal, a SYNC CW signal, and a baud rate associated with the received serial bit stream, respectively. These three detectors 208, 210, 214, are coupled to a transmission synchronizer 230 which is coupled to the controller 205. The three detectors under control of the transmission synchronizer 230 can establish and maintain synchronization with a transmitted signal, and can re-synchronize to a new transmitted signal, as will be more fully discussed below. The aforementioned three detectors 208, 210, 214, the address correlator 212, and the data decoder 206, may be implemented in hardware, or in software, or in a combination of both hardware and software.

Furthermore, a timer module 226 is coupled to the controller 205 for providing timing functions for the micro-computer 204. Also, a battery saver module 228 is coupled to the controller 205 and to the receiving circuitry 203 for conserving power in the selective call receiver 200. Under control of the controller 205, the battery saver module 228 may disable the receiving circuitry 203 and other functions within the receiver 200 to conserve battery power, as will be more fully discussed below.

More specifically, in the micro-computer 204 the serial bit stream is coupled to the baud rate detector 214 that determines a receiving data rate associated with the recovered information. The baud rate detector 214 may provide an information filtering function in that a recovered information signal having a predetermined baud rate may indicate the presence of a transmitted signal of interest to the receiver 200. Consequently, the serial bit stream having the predetermined baud rate may be further processed by the micro-computer 204, and otherwise normally ignored. This has the advantage of providing an early detection of whether to continue processing a received serial bit stream or to conserver battery power.

When the receiving data rate is determined coincident with the predetermined baud rate, the preamble detector 208 then begins synchronization between the selective call receiver and a new transmitted signal. The preamble signal is a predetermined signal for the POCSAG protocol, normally comprising a predetermined bit pattern, such as a series of alternating ones and zeros for a predetermined number of information bits. The detection of preamble indicates the start of a new transmission.

Once the preamble is detected, the transmission synchronizer 230 instructs the SYNC CW detector 210 to search the serial bit stream for a full thirty two bits of SYNC CW signal, which is a predetermined signal for the POCSAG protocol. Detection of the SYNC CW signal with less than three error bits indicates the beginning of a first batch in the transmitted signal. That is, when thirty two bits of a recovered information signal match the thirty two bits of the predefined SYNC CW signal with less than three differences in the bits, the selective call receiver is synchronized to the present transmitted signal.

When synchronization is established with the transmitted signal, the controller 205 enables the address correlator 212 at an appropriate time interval for detecting the presence of an address signal matching a preassigned address for the selective call receiver 200. The controller 205 determines the time interval for searching for address information based on a POCSAG frame preassigned to the receiver 200. The timer module 226 provides the necessary timing function to indicate the presence of the frame time interval, which is a predetermined delay from the detected SYNC CW signal, in accordance with the POCSAG protocol. To determine the selection of the selective call receiver 200, the address correlator 212 correlates a recovered address signal with a preassgined address or addresses stored in the selective call receiver's nonvolatile memory 216. The non-volatile memory 216 typically has a plurality of registers for storing a plurality of configuration words that characterize the operation of the selective call receiver 200.

When the addresses correlate, the controller 205 may in a tone-only mode activate an alert 220, such as an audible alert. Alternatively, if a data (numeric or alphanumeric) address signal is received and correlated, the decoder 206 couples message information to the message memory 222. In accordance with the recovered information, and settings associated with the user controls 218, such as buttons or switches, the selective call receiver 200 presents at least a portion of the message information, such as by a display 224, and indicates to the user via an audible, visual, or tactile alert 220 that a message has been received. The user may view the information presented on the display 224 by activating the appropriate user controls 218.

The micro-computer 204 may also include items such as a conventional signal multiplexer, a voltage regulator and control mechanism, a current regulator and control mechanism, audio power amplifier circuitry, control interface circuitry, and display illumination circuitry. These elements are arranged in a known manner to provide an information receiver as requested by a customer.

The general operation of a paging receiver of the type shown in FIG. 2 is well known and is more fully described in U.S. Pat. No. 4,518,961, issued May 21, 1985, to Davis et al., U.S. Pat. No. 4,995,099, issued Feb. 19, 1991, to Davis, and U.S. Pat. No. 4,996,526, issued Feb. 26, 1991, to DeLuca, all being commonly assigned to the assignee of the present invention and the teachings of which are hereby incorporated by reference.

When the transmission synchronizer 230 synchronizes with the transmitted signal, the selective call receiver 200 searches only those preassigned frames associated with the receiver for pages intended for the selective call receiver 200. During the time intervals between monitoring preassigned frames, and between monitoring during periodic sampling time intervals for the SYNC CW signal, the micro-computer 204 will preferably "shut-down" the receiving circuitry 203 and disable certain functions within the micro-computer 204 to conserve battery power. The time intervals between monitoring frames and monitoring for the SYNC CW signals are known in the art as "sleep" periods. The POCSAG protocol normally provides that no pages are missed during the sleep periods. A receiver that operates in the fashion discussed above is said to be operating in a "battery saving" mode.

The transmission synchronizer 230 activates the SYNC CW detector 210 during periodic sampling time intervals for detecting subsequently transmitted SYNC CW signals. Specifically, the SYNC CW detector 210 is activated coincident with the expected occurrence of a first portion of the SYNC CW signal. Preferably, a first portion of the SYNC CW signal is monitored during a corresponding first portion of the periodic sampling time interval, such as the first eight bits of the SYNC CW signal. In the event the first eight bits of a received and recovered information signal match the first eight bits of the SYNC CW signal with less than two bit errors, the SYNC CW signal is considered detected. Consequently, a signal from the SYNC CW detector 210 causes the controller 205 to activate the battery saver 228 for a second portion of the SYNC CW signal. The battery saver 228 disables power consumption by the receiving means 203 during the last twenty four bits of the SYNC CW signal thereby conserving power during a second portion of the SYNC CW signal.

In the event the SYNC CW detector 210 does not detect the first eight bits with less than two bit errors, the transmission synchronizer 230 will attempt to detect the start of a new transmission during the last twenty four bits of the periodic sampling time interval. Specifically, the preamble detector 208 attempts to correlate twenty four information bits received during the second portion of the periodic sampling time interval to twenty four bits of the preamble signal, with less than three bit errors. Hence, the preamble detector 208 under control of the transmission synchronizer 230 tests the last twenty four bits received with twenty four bits of the predetermined preamble signal. A difference of less than three bits constitutes an affirmative correlation of the preamble signal.

Once the preamble signal is detected, indicating the start of a new transmission, the transmission synchronizer 230 instructs the SYNC CW detector 210 to search for the full thirty two bits of SYNC CW signal to synchronize the receiver 200 with the new transmission. Specifically, the detection of the preamble signal during the second portion of the periodic sampling time interval restarts the synchronizing process by invoking the SYNC CW detector 210 to search for the first occurrence of the SYNC CW signal in the newly transmitted signal. Consequently, the detection of the first SYNC CW signal establishes subsequent periodic sampling time intervals for detecting subsequent SYNC CW signals within the new transmission.

A significant advantage over prior known methods is obtained by correlating for the preamble signal during the second portion of the periodic sampling time interval. Specifically, the receiver 200 can conserve battery power by only correlating the first eight bits of the SYNC CW signal during the first portion of the periodic sampling time interval. In the event that the first eight bits of the SYNC CW signal are not detected in the first eight bits of the periodic sampling time interval, the receiver 200 correlates the remaining twenty four bits of the periodic sampling time interval to the preamble signal. This assures reliable monitoring of the first occurrence of the SYNC CW signal within the new transmission, which is necessary to avoid missing pages. Therefore, the receiver 200 may avoid missing a page in the first batch of the new transmission, as is more fully discussed below.

Figure 3A:
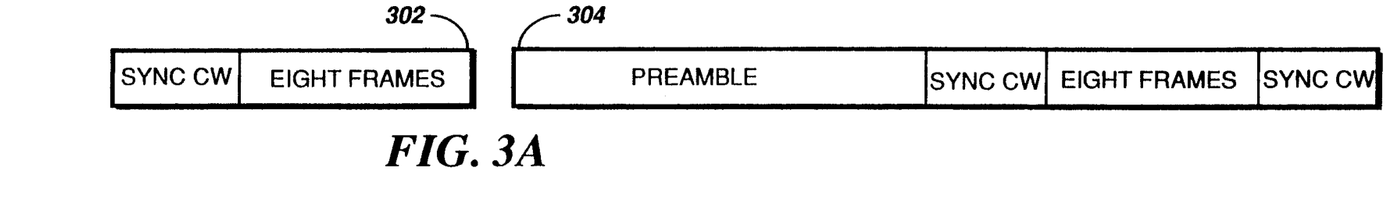
FIG. 3A illustrates a POCSAG signalling scenario.
Figure 3B:
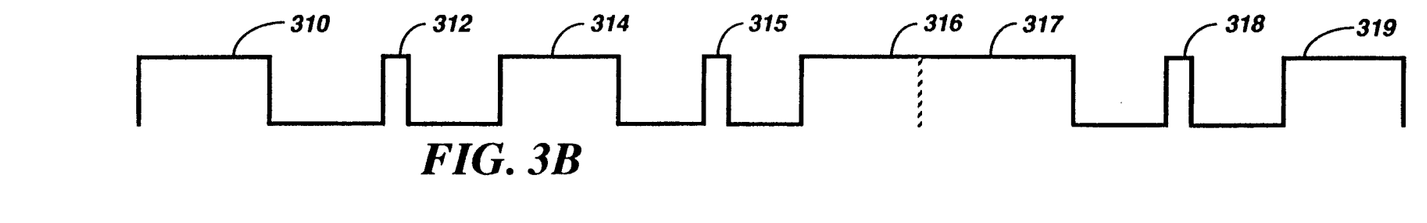
FIGS. 3B and 3C show two power conservation strobe signal waveforms re-synchronizing to a new POCSAG transmission.
Figure 3C:
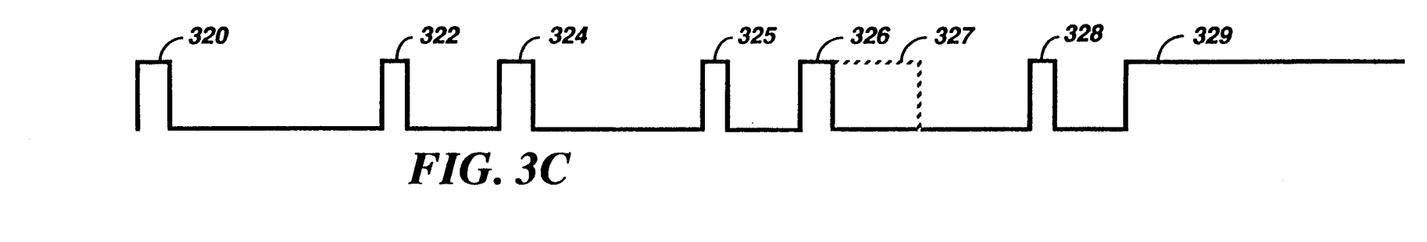
Figure 3D:
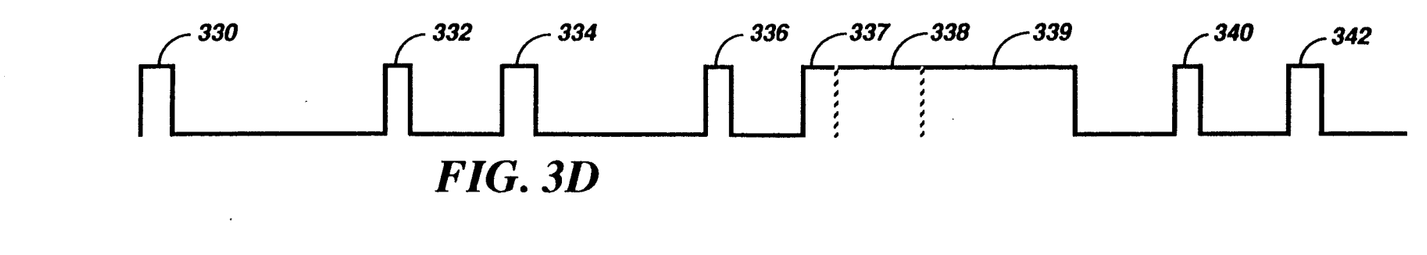
FIG. 3D shows a power conservation strobe signal waveform re-synchronizing to a new POCSAG transmission, in accordance with a preferred embodiment of the present invention.

Referring to FIGS. 3A, 3B, 3C, and 3D, three power conservation strobe signal waveforms are shown relative to the start of a new POCSAG transmission requiring re-synchronization thereto. FIG. 3A shows a POCSAG signalling scenario where a prior known method may miss a page transmitted in the first batch of a new transmission. Specifically, FIG. 3A shows the end of a transmitted signal 302 followed by the beginning of a new transmitted signal 304 after an indeterminate amount of time. FIG. 3B illustrates a full thirty two bit SYNC CW signal detection method that does not conserve battery power during even a portion of the SYNC CW signal. FIG. 3C illustrates a partial SYNC CW signal detection method that may conserve battery power during a second portion of the SYNC CW signal. However, the method has the draw back that it may miss a page during the first batch of a new transmission under certain signalling conditions. Lastly, FIG. 3D illustrates a partial SYNC CW signal detection method with detection of the preamble signal during the second portion of the periodic sampling time interval, according to the present invention. This method has the advantage of conserving power during the second portion of the periodic sampling time interval, while avoiding missing pages during the first batch of a new transmission. The three aforementioned transmission synchronization methods are discussed relative to the signalling scenario of FIG. 3A.

Referring to FIG. 3B, the full SYNC CW signal detection method periodically receives and detects the full thirty two bits of SYNC CW 310, with less than three error bits. Then, the preassigned frame is searched for address information 312. In the next periodic sampling time interval the receiver does not detect the SYNC CW signal 314. The receiver then searches for address information in the preassigned frame 315, and subsequently looks again for the full SYNC CW signal 316. At this point, the receiver determines lack of synchronization with the previous transmission, and performs a baud rate detection followed by a search for a subsequent SYNC CW signal 317. This successfully synchronizes the receiver with the new transmission. Thereafter, the preassigned frame is searched for address information 318 and the subsequent full SYNC CW signal is received and detected 319 to maintain synchronization with the new transmission. However, no battery savings accrue during the periodic time intervals for monitoring for the full thirty two bits of SYNC CW signal Referring to FIG. 3C, the partial SYNC CW signal detection method periodically receives and detects the first eight bits of SYNC CW signal 320, with less than two error bits. The receiver 200 then conserves battery power during the remaining twenty four bits of the SYNC CW signal. Subsequently, the preassigned frame is search for address information 322. In the next periodic sampling time interval the receiver may falsely detect the presence of the first eight bits of the SYNC CW signal 324 with less than two error bits, even though the SYNC CW signal is not there. This may be due to such signalling phenomena as noise signals present, warm-up tones present at start of a new transmission, or poor or out of phase sampling of recovered information bits.

The receiver then searches for address information in the preassigned frame 325, and subsequently looks again for the first eight bits of a SYNC CW signal 326. At this point, the receiver determines that the first eight bits sampled do not match with the first eight bits of the SYNC CW signal. Optionally, the receiver may attempt to correlate the remaining twenty four bits of the sampling time interval to the remaining twenty four bits of the SYNC CW signal 327 with less than three error bits. This optional correlation would also indicate the lack of detection of a SYNC CW signal. Unfortunately, the delay in detecting the lack of a SYNC CW signal until well into the preamble signal of the new transmission results in a missed first batch of the new transmission, as discussed below.

In response to the first detection of lack of a SYNC CW signal 326, 327, the receiver unsuccessfully searches for address information in the preassigned frame 328, and subsequently looks again for the first eight bits of a subsequent SYNC CW signal 329. The receiver 200 does not detect the SYNC CW signal for a second time, and then typically performs a baud rate detection followed by a search for a subsequent full thirty two bits of SYNC CW signal 329. Once the full SYNC CW signal is detected, synchronization with the new transmission is obtained 329. Although this partial SYNC CW signal detection method conserves more battery power than the full SYNC CW signal detection method discussed earlier for FIG. 3B, the first batch of information in the new transmission may be missed under certain signalling conditions.

Referring to FIG. 3D, the partial SYNC CW signal detection method with detection of the preamble signal during the second portion of the periodic sampling time interval operates as follows. The receiver periodically receives and detects the first eight bits of SYNC CW 330, with less than two error bits. Then, the preassigned frame is searched for address information 332. In the next periodic sampling time interval the receiver may falsely detect the presence of the first eight bits of the SYNC CW signal 334 with less than two error bits, even though the SYNC CW signal is not there. The preassigned frame is searched for address information 336, and in the next periodic sampling time interval the receiver does not detect the presence of the first eight bits of the SYNC CW signal 337 with less than two error bits. The receiver then correlates the remaining twenty four bits of the periodic sampling time interval to twenty four bits of the preamble signal with less than three bit errors 338. The preamble signal being detected 338, the receiver continues to search for the full SYNC CW signal until it detects it 339. At this point, synchronization with the new transmission is established in time to monitor the first batch of the new transmission. The preassigned frame is searched for address information 340, and the first eight bits of the subsequent periodic sampling time interval are successfully correlated to the first eight bits of the SYNC CW signal 342 to maintain synchronization with the new transmission. In this way, the power conservation benefit of the partial SYNC CW signal detection method is achieved while reliably detecting the first batch of a new transmission.

Figure 4A:
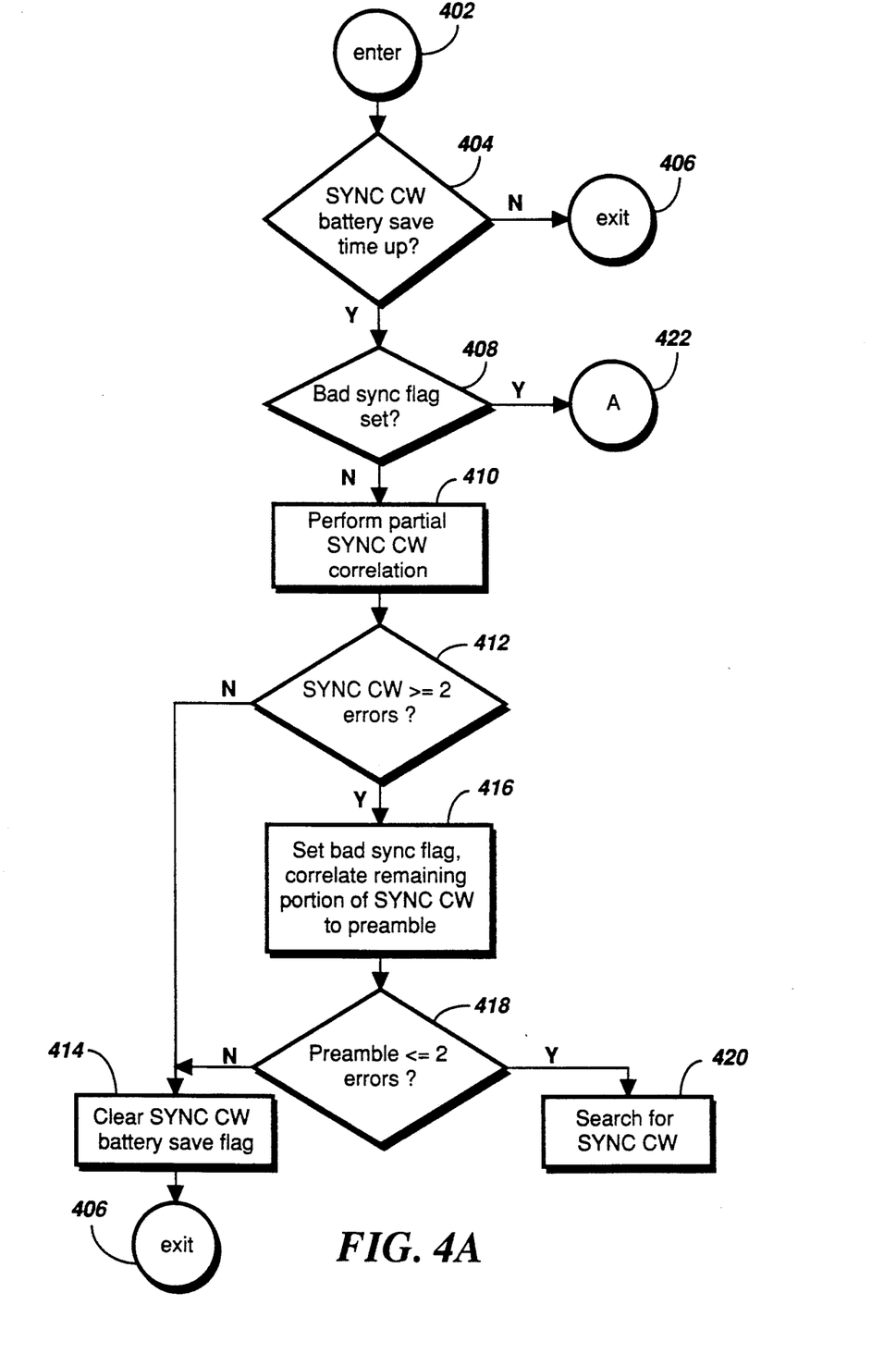
FIGS. 4A and 4B comprise a flow diagram for the transmission synchronizer of FIG. 2, in accordance with a preferred embodiment of the present invention.
Figure 4B:
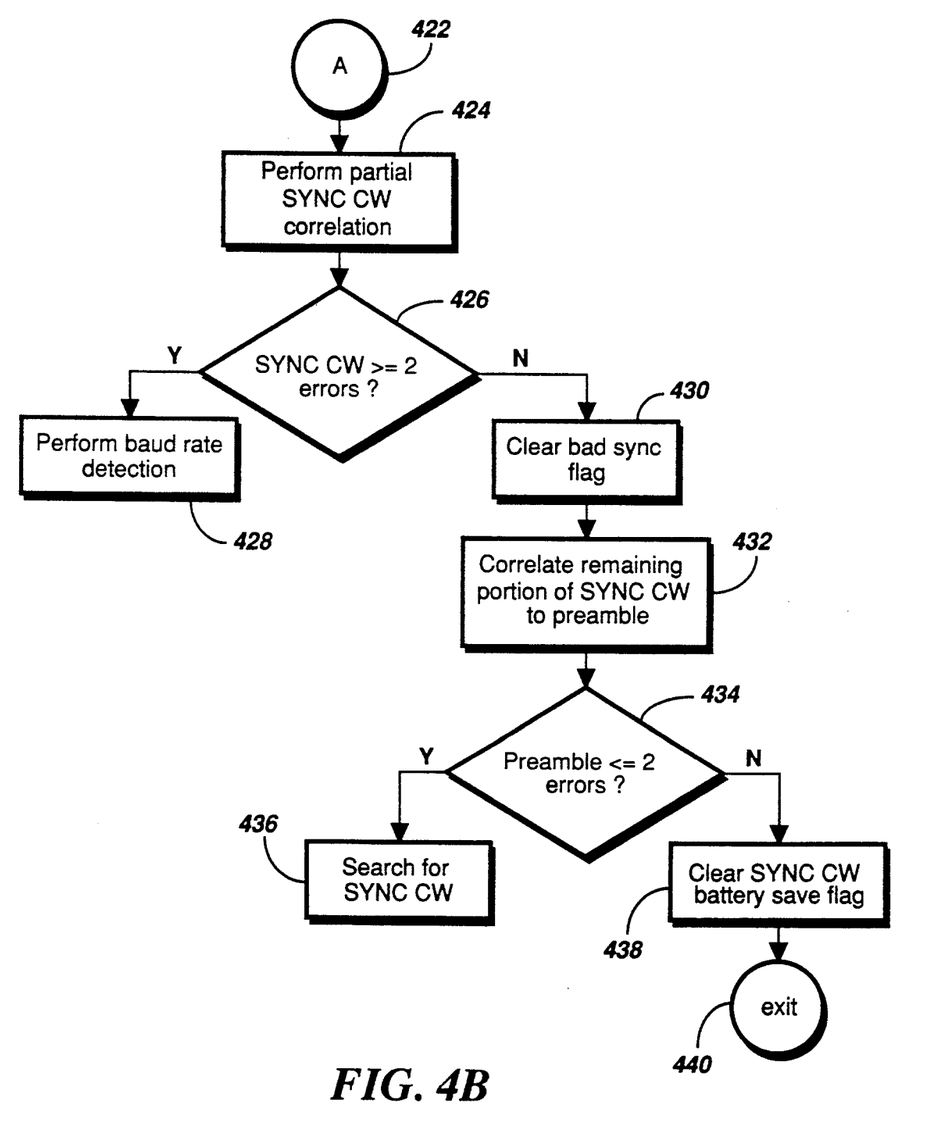

FIGS. 4A and 4B comprise a flow diagram for the transmission synchronizer 230, according to the preferred embodiment of the present invention. Referring to FIG. 4A, the receiver periodically samples received information bits during predetermined periodic sampling time intervals 402, 404, 406. These periodic sampling time intervals are established upon synchronization with the current transmitted signal. This is accomplished upon detection of the first full SYNC CW signal within the current transmission with less than three bit errors.

The receiver maintains synchronization and conserves battery power by receiving a partial SYNC CW signal, such as the first eight bits of the SYNC CW signal, and correlating the received eight bits of information to the first eight bits of the predefined SYNC CW signal 402, 404, 408, 410. If the received eight bits of information match the first eight bits of the predefined SYNC CW signal with less than two bit errors 412, then the SYNC CW signal is determined to be detected. Power conservation may be achieved by inhibiting the receiving circuitry 203, the decoding means 206, and disabling other non-essential circuits and functions in the receiver 200 during the battery save "sleep" cycle, such as between looking for the first eight bits of subsequent SYNC CW signals 412, 414, 406, 402. This power conservation also occurs during the second portion of the periodic sampling time interval, such as during the last twenty four bits of the SYNC CW signal.

If the first eight bits of information received during the first eight bits of the periodic sampling time interval do not match with the predefined SYNC CW signal with less than two bit errors 412, then the SYNC CW signal is determined to be not detected. A bad sync flag is set in memory 222 to mark this condition for future reference 416. Further, the remaining twenty four bits of the periodic sampling time interval are correlated to preamble 416. If preamble is detected with less than three bit errors, then the transmission synchronizer 230 determines the event to indicate the occurrence of a new transmission 418. Consequently, the transmission synchronizer 230 instructs the SYNC CW detector 210 to search for the first occurrence of a full SYNC CW signal in the new transmission 420. Once the full thirty two bits of SYNC CW signal are detected, the receiver 200 has synchronized to the new transmission and then establishes subsequent periodic sampling time intervals 420. These subsequent periodic sampling time intervals search for a partial SYNC CW signal as discussed above, thereby conserving power while maintaining synchronization with the transmission.

If the preamble signal is not detected with less than three bit errors 418, then the receiver continues battery saver cycling 418, 414, 406, locking for a subsequent occurrence of a SYNC CW signal. This is due to neither the SYNC CW signal nor the preamble signal being detected during the current sampling time interval 412, 416, 418, 414, 406. Notice that the first occurrence of a lack of SYNC CW signal detection is flagged for future reference 416.

On the next periodic sampling time interval 402, 404, the previously flagged lack of SYNC CW signal detection 408 causes the transmission synchronizer 230 to perform a partial SYNC CW signal correlation, 422, 424 (see FIG. 4B). If the first eight bits of the periodic sampling time interval do not match with the first eight bits of the SYNC CW signal with less than two bit errors, the SYNC CW signal is again determined to be not detected 424, 426. Consequently, synchronization with the current transmission is lost, and the transmission synchronizer 230 instructs the baud rate detector 214 to perform a baud rate detection on the recovered information signal 428. Subsequently, the receiver searches for preamble signal, since the synchronization with the current transmission was lost.

If the first eight bits of the SYNC CW signal are detected with less than two bit errors 426, then the previous lack of SYNC CW signal detection condition is cleared 430. However, the remaining twenty four bits of the periodic sampling time interval are correlated to the preamble signal 432. This guards against a false positive detection of a partial SYNC CW signal under certain signalling conditions 426, 430, while in the presence of a preamble signal of a new transmission. If the preamble is detected with less than three bit errors 434, then immediately search for the SYNC CW signal 434, 436, since the start of a new transmission is indicated. Alternatively, if the preamble signal is not detected with less than three bit errors 434, then continue battery saver cycling 434, 438, 440. That is, subsequent to a partial SYNC CW signal not being detected, on the next periodic sampling time interval, if the partial SYNC CW signal is detected 426, and no preamble signal is detected during the second portion of the periodic sampling time interval 430, 432, 434, then the transmission synchronizer 230 determines continued synchronization with the current transmission. Accordingly, power conservation strobing is maintained 434, 440.

Thus, the method and apparatus discussed above can conserve power during a portion of the periodic predetermined signal, e.g., a portion of the SYNC CW signal, while maintaining synchronization of the receiver to the transmitted signal. Further, the receiver can re-synchronize to a new transmission in time to reliably detect the first batch thereof, which is a significant advantage over prior known methods of transmission synchronization.

What is claimed is:

1. A method for synchronizing a receiver to a transmitted signal, the transmitted signal having a first predetermined signal for indicating a start of a new transmission to the receiver and having a second predetermined signal inserted at periodic sampling time intervals for synchronizing the receiver to the transmitted signal, the method comprising the steps of:
   (a) synchronizing to the transmitted signal by detecting the first predetermined signal followed by the second predetermined signal, and establishing subsequent periodic sampling time intervals therefrom;
   (b) conserving power in the receiver during a second portion of one of the periodic sampling time intervals following a detection of a first portion of the second predetermined signal during a first portion of the one of the periodic sampling time intervals; and
   (c) searching for a portion of the first predetermined signal during the second portion of the one of the periodic sampling time intervals following a lack of detection of the first portion of the second predetermined signal during the first portion of the one of the periodic sampling time intervals.

2. The method of claim 1, further comprising the step of:
   (d) determining the start of a new transmission when the portion of the first predetermined signal is found in step (c).

3. A method for synchronizing a receiver to a transmitted signal while conserving power within the receiver, the transmitted signal having a first predetermined signal for indicating the start of a new transmission to the receiver and having a second predetermined signal inserted at periodic sampling time intervals for synchronizing the receiver to the transmitted signal, the method comprising the steps of:
   (a) receiving and detecting the first predetermined signal followed by the second predetermined signal for obtaining synchronization of the receiver with the transmitted signal and for establishing periodic sampling time intervals from the second predetermined signal for detecting subsequently transmitted second predetermined signals;
   (b) receiving and recovering a first information signal during a first portion of one of the periodic sampling time intervals;
   (c) determining whether the first information signal matches a first portion of the second predetermined signal, thereby constituting a detection of the second predetermined signal to maintain synchronization with the transmitted signal;
   (d) conserving power during a second portion of the one of the periodic sampling time intervals following the detection of the second predetermined signal during the first portion of the one of the periodic sampling time intervals;
   (e) receiving and recovering a second information signal during the second portion of the one of the periodic sampling time intervals following the lack of detection of the second predetermined signal during the first portion of the one of the periodic sampling time intervals; and
   (f) determining whether the second information signal matches a portion of the first predetermined signal, thereby constituting a detection of the first predetermined signal indicating the start of a new transmission.

4. The method of claim 3, further comprising the step of returning to step (a) in response to a detection of the first predetermined signal subsequent to step (f).

5. The method of claim 3, wherein step (d) includes the step of inhibiting a receiving means to conserve power.

6. The method of claim 3, wherein the received and recovered first information signal includes a predetermined number of information bits corresponding to a number of bits in a predefined signal, and the second predetermined signal is detected when the number of differences between the first information signal and the predefined signal is less than a predetermined number of differences.

7. The method of claim 6, wherein the predetermined number of information bits is eight and the predetermined number of differences is two.

8. The method of claim 3, wherein the first predetermined signal includes information bits defined by a predetermined bit pattern, and the second information signal corresponds to a predetermined number of the information bits, and the first predetermined signal is detected indicating the start of a new transmission when the number of differences between the second information signal and a portion of the predetermined bit pattern corresponding to the predetermined number of the information bits are less than a predetermined number of differences.

9. The method of claim 8, wherein the predetermined bit pattern comprises alternating ones and zeros, the predetermined number of information bits is twenty four, and the predetermined number of differences is three.

10. The method of claim 3, further comprising the steps of:

(g) receiving and recovering a third information signal during a first portion of a subsequent one of the periodic sampling time intervals following the lack of detection of the first predetermined signal in step (f);

(h) determining whether the third information signal matches a first portion of the second predetermined signal, thereby constituting a detection of the second predetermined signal to maintain synchronization with the transmitted signal;

(i) receiving and recovering a fourth information signal during a second portion of the subsequent one of the periodic sampling time intervals following the lack of detection of the first predetermined signal in step (f); and (j) determining whether the fourth information signal matches a a portion of the first predetermined signal, thereby constituting a detection of the first predetermined signal indicating the start of a new transmission.

11. The method of claim 10, further comprising the step of:

(k) maintaining synchronization with the transmitted signal following the detection of the second predetermined signal in step (h) and the lack of detection of the first predetermined signal in step (j).

12. The method of claim 10, further comprising the step of:

(l) determining the start of a new transmission following the detection of the first predetermined signal in step (j).

13. A receiver comprising:

receiving means for receiving a transmitted signal having a first predetermined signal for indicating a start of a new transmission to the receiver, and having a second predetermined signal inserted at periodic sampling time intervals for synchronizing the receiver to the transmitted signal;

control means coupled to the receiving means for obtaining synchronization to the transmitted signal in response to a detection of a first occurrence of the second predetermined signal, and for establishing periodic sampling time intervals therefrom, and further for maintaining synchronization to the transmitted signal by detecting a first portion of the second predetermined signal during the first portion of one of the established periodic sampling time intervals;

power conserving means responsive to the control means for disabling the receiving means to conserve power during a second portion of one of the established periodic sampling time intervals following the detection of a first portion of the second predetermined signal during the first portion of the one of the established periodic sampling time intervals; and transmission synchronizing means coupled to the receiving means and the control means for determining the start of a new transmission in response to a detection of a portion of the first predetermined signal during the second portion of the one of the established periodic sampling time intervals following the lack of detection of the first portion of the second predetermined signal during the first portion of the one of the established periodic sampling time intervals.

14. The receiver of claim 13, wherein the first portion of the second predetermined signal includes a predetermined number of information bits corresponding to the number of bits in a predefined signal, and the first portion of the second predetermined signal is detected when the number of differences between the first portion of the second predetermined signal and the predefined signal is less than a predetermined number of differences.

15. The receiver of claim 14, wherein the predetermined number of information bits in the first portion of the second predetermined signal is eight and the predetermined number of differences is two.

16. The receiver of claim 13, wherein the first predetermined signal includes information bits defined by a predetermined bit pattern, the second portion of the one of the established periodic sampling time intervals corresponds to a predetermined number of the information bits, and the portion of the first predetermined signal is detected indicating the start of a new transmission when the number of differences between the portion of the first predetermined signal and a portion of the predetermined bit pattern corresponding to the predetermined number of the information bits is less than a predetermined number of differences.

17. The receiver of claim 16, wherein the predetermined bit pattern comprises alternating ones and zeros, the predetermined number of information bits in the portion of the first predetermined signal is twenty four, and the predetermined number of differences is three.

* * * * *